United States Patent
Yin et al.

(10) Patent No.: US 9,729,424 B2
(45) Date of Patent: Aug. 8, 2017

(54) DEFINING DATA FLOW PATHS IN SOFTWARE-DEFINED NETWORKS WITH APPLICATION-LAYER TRAFFIC OPTIMIZATION

(71) Applicant: Futurewei Technologies, Inc., Plano, TX (US)

(72) Inventors: Hongtao Yin, Fremont, CA (US); Ting Zou, Cupertino, CA (US); Haiyong Xie, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 150 days.

(21) Appl. No.: 13/915,410

(22) Filed: Jun. 11, 2013

(65) Prior Publication Data

US 2013/0329601 A1  Dec. 12, 2013

Related U.S. Application Data

(60) Provisional application No. 61/658,089, filed on Jun. 11, 2012.

(51) Int. Cl.
*H04L 12/751* (2013.01)
*H04L 12/24* (2006.01)
(Continued)

(52) U.S. Cl.
CPC .......... *H04L 45/02* (2013.01); *H04L 41/0823* (2013.01); *H04L 45/04* (2013.01);
(Continued)

(58) Field of Classification Search
USPC ........................................ 370/254
See application file for complete search history.

(56) References Cited

U.S. PATENT DOCUMENTS 8,924,508 B1 * 12/2014 Medved ............ H04L 29/08072
709/217
2004/0199664 A1 * 10/2004 Feldman ................. H04L 45/02
709/238

(Continued)

OTHER PUBLICATIONS

Gurbani, V.K., "Abstracting Network State in Software Defined Networks (SDN) for Rendevous Services," Software Defined Networks, Jun. 10, 2012, pp. 6627-6632.

(Continued)

*Primary Examiner* — Yaotang Wang
(74) *Attorney, Agent, or Firm* — Conley Rose, P.C.

(57) ABSTRACT

A method implemented by a software defined network (SDN) controller, the method comprising receiving, from a network node, a request for path optimization, wherein the request comprises information identifying the network node and a destination node, forwarding the request to an application layer traffic optimization (ALTO) server, receiving, from the ALTO server, path information that identifies a plurality of SDN domains to be traversed from the network node to the destination node, wherein the plurality of SDN domains comprises a first SDN domain, in which the SDN controller resides, and a second SDN domain, in which an edge node known by the SDN controller resides, and determining a first path segment from the network node to the edge node.

24 Claims, 5 Drawing Sheets

(51) Int. Cl.
H04L 12/715 (2013.01)
H04L 12/721 (2013.01)
(52) U.S. Cl.
CPC .............. *H04L 45/34* (2013.01); *H04L 45/44* (2013.01); *H04L 45/64* (2013.01)

(56) References Cited

U.S. PATENT DOCUMENTS

| | | | | |
|---|---|---|---|---|
| 2008/0219272 | A1* | 9/2008 | Novello et al. ............... | 370/401 |
| 2012/0005465 | A1* | 1/2012 | Attanasio et al. ................ | 713/1 |
| 2012/0051221 | A1* | 3/2012 | Bui ..................... | H04L 12/5695 |
| | | | | 370/235 |
| 2012/0144066 | A1* | 6/2012 | Medved et al. ............. | 709/242 |
| 2012/0281621 | A1* | 11/2012 | Lotfallah .............. | H04L 12/145 |
| | | | | 370/328 |
| 2014/0294011 | A1* | 10/2014 | Roessler ................ | H04L 45/04 |
| | | | | 370/392 |
| 2015/0163125 | A1* | 6/2015 | Caviglia ................ | H04L 45/44 |
| | | | | 370/254 |

OTHER PUBLICATIONS

Zou, T., et al. U.S. Appl. No. 13/801,850, filed Mar. 13, 2013, "Supporting Software Defined Networking With Application Layer Traffic Optimization," 26 pgs.

* cited by examiner

DEFINING DATA FLOW PATHS IN SOFTWARE-DEFINED NETWORKS WITH APPLICATION-LAYER TRAFFIC OPTIMIZATION

CROSS-REFERENCE TO RELATED APPLICATIONS

The present application claims priority to U.S. Provisional Patent Application No. 61/658,089 filed Jun. 11, 2012 by H. Yin and entitled "A Method of Supporting Application to Define Data Flow Path in Software-Defined Networks with Application-Layer Traffic Optimization", which is incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks comprise network nodes, such as routers, switches, bridges, and other devices that transport data through the network. Over the years, the telecommunication industry has made significant improvements to the network nodes to support an increasing number of protocols and specifications standardized by the Internet Engineering Task Force (IETF). Creating and coupling the complex network nodes to form networks that support and implement the various IETF standards (e.g. virtual private networks requirements) has inadvertently cause modern networks to become labyrinth-like and difficult to manage. As a result, vendors and third-party operators continually struggle to customize, optimize, and improve the performance of the interwoven web of network nodes.

Software defined networking (SDN) is an emerging network technology that addresses customization and optimization concerns within convoluted networks. SDN simplifies modern networks by decoupling the data-forwarding capability (e.g. a data plane) from routing, resource, and other management functionality (e.g. a control plane) previously performed in the network nodes. Network nodes that support SDN (e.g., that are SDN compliant) may be configured to implement the data plane functions, while the control plane functions may be provided by a SDN controller. Open application programming interface (API) services, such as the OpenFlow protocol, may manage the interactions between the data plane and control plane and allow for the implementation of non-vendor specific combinations of networking nodes and SDN controllers within a network. As a result, SDN in conjunction with an Open API service may provide numerous benefits to modern networks that include increased network virtualization, flexible control and utilization of the network, and customization of networks for scenarios with specific requirements.

Modern networks, such as data center networks, enterprise networks, and carrier networks, may gradually adopt SDN because of the numerous potential benefits. The deployment of SDN into large-scale distributed networks may be implemented incrementally. In other words, a network administrator for a large-scale network, such as an autonomous system (AS), may partition the entire network into multiple smaller sub-networks. Some of the sub-networks may be SDN compatible, in which case a sub-network may be referred to as a SDN domain, while other sub-networks may not be SDN compatible. Unfortunately, network services, such as application layer traffic optimization (ALTO), may encounter integration problems when implementing SDN within a large-scale network.

Specifically, optimization of data flow paths may be one of the problems. Suppose, for example, in a network comprising a plurality of SDN domains and interacting with an ALTO server, a source node, in which an application starts to send out a data flow, may be covered in one SDN domain, while a destination node for which the data flow is intended for may be covered in another SDN domain. The ALTO server may compute, based on application layer data, an optimal or best path for this data flow, and the best path may cross multiple intermediate SDN domains. Since a source SDN controller, which oversees the SDN domain wherein the source node resides, may not have knowledge of all other SDN domains, the source SDN controller may not know where to send the path setup information for a next SDN controller. There may be multiple physical link paths from the source node to the destination node. However, a traditional Internet protocol (IP) routing path may be different from an ALTO path. Consequently, the IP best path computed by the source SDN controller may not the best path as computed by the ALTO server.

SUMMARY

In one embodiment, the disclosure includes a method implemented by a SDN controller, the method comprising receiving, from a network node, a request for path optimization, wherein the request comprises information identifying the network node and a destination node, forwarding the request to an ALTO server, receiving, from the ALTO server, path information that identifies a plurality of SDN domains to be traversed from the network node to the destination node, wherein the plurality of SDN domains comprises a first SDN domain, in which the SDN controller resides, and a second SDN domain, in which an edge node known by the SDN controller resides, and determining a first path segment from the network node to the edge node.

In another embodiment, the disclosure includes an apparatus comprising at least one transceiver configured to receive, from a network node, a request for path optimization, wherein the request comprises information identifying the network node and a destination node, forward the request to an ALTO server, and receive, from the ALTO server, path information that identifies a plurality of SDN domains to be traversed from the network node to the destination node, wherein the plurality of SDN domains comprises a first SDN domain, in which the apparatus and the network reside, and a second SDN domain, in which an edge node known by the apparatus resides, and a processor coupled to the at least one transceiver and configured to determine a first path segment from the network node to the edge node.

In yet another embodiment, the disclosure includes a method implemented by an ALTO server located in a network, the method comprising receiving, from an ALTO client, a request for path optimization, wherein the request comprises information identifying a source node and a destination node, determining a plurality of SDN domains to be traversed from the source node to the destination node, and sending, to the ALTO client, path information that identifies the plurality of SDN domains.

In yet another embodiment, the disclosure includes a method implemented by a network node comprising a SDN application, the method comprising sending, to an ALTO server, a request message comprising information identifying a destination node, and receiving, from the ALTO server, path information that identifies a plurality of SDN domains to be traversed from the network node to the destination node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are apparatuses, schemes, and methods to allow an application to define a data flow path across multiple SDN domains in an AS. Segments of the path may be determined by SDN controllers with the help of an ALTO server managing the entire AS. In an embodiment, a SDN application running on a source node may send a request for path optimization to a SDN controller, which may forward the request to the ALTO server. The request may identify a set of destinations, which may be ordered by the ALTO server in terms of their preference to be used by the source node. The ALTO server may base its ordering of the destinations at least partly on application layer data of the involved SDN domains. Further, the ALTO server may return path information identifying the involved SDN domains, and such path information may be in the form of SDN identifiers (IDs) or meta information. A SDN controller located in each of the involved SDN domains may determine its local path segment, e.g., based on network layer data. Then, a view of the whole path may be aggregated and sent to the source node. Data flow from the source node may be forwarded to the most preferred destination following the determined best path. Overall, the disclosed embodiments may improve integration and coordination of SDN applications, SDN controllers, and the ALTO server.

Figure 1:
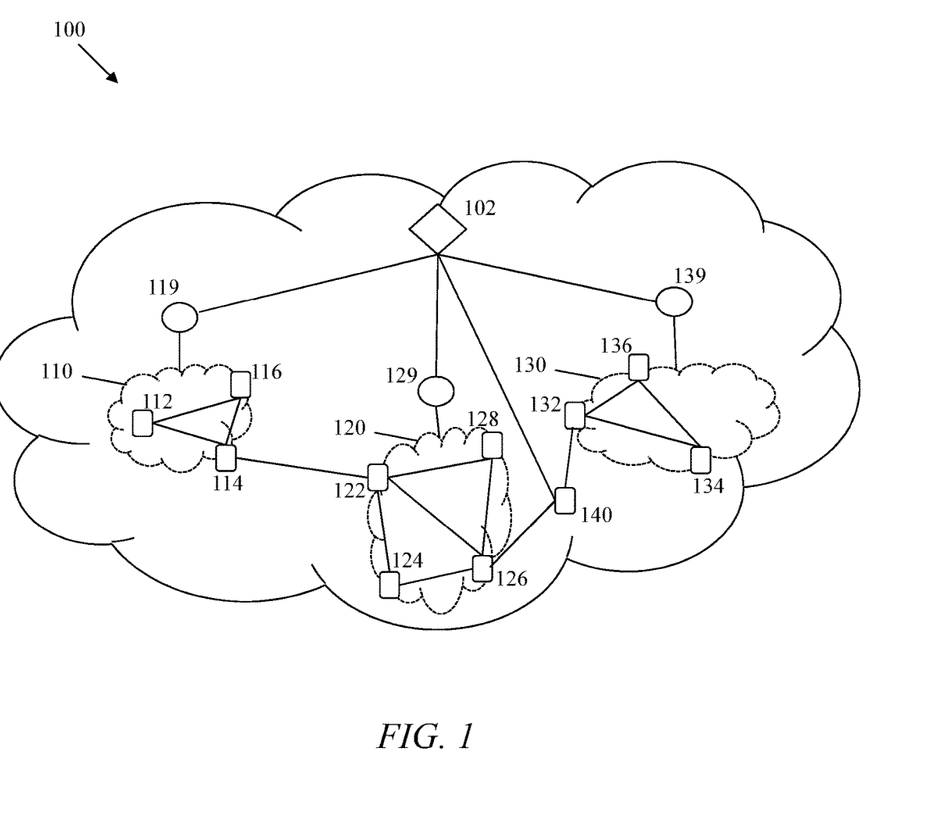
FIG. 1 is a schematic diagram of an embodiment of a network.

FIG. 1 is a schematic diagram of an embodiment of a network 100 that supports the integration of SDN with ALTO. Network 100 may be any network that transports data, such as Internet Protocol (IP) networks, Multiprotocol Label Switching (MPLS) networks, Ethernet networks, and data center networks. Network 100 may be a network comprising one or more local area networks (LANs), virtual networks, and/or wide area networks (WANs). Network 100 may be a network that operates in the electrical, optical, or a combination of both domains. Network 100 may offer data services that forward data from one node to another node without using pre-configured routes. Another embodiment of network 100 may forward data from one node to another node across the network along pre-configured or pre-established paths.

As shown in FIG. 1, network 100 may be implemented as an AS comprising an ALTO node or server 102 and a plurality of SDN domains, such as domains 110, 120, and 130, which may interact with the ALTO server 102. Each SDN domain may comprise one or more network nodes, and each SDN domain may be controlled or managed by a SDN controller. For example, the SDN domain 110 may comprise network nodes 112, 114, and 116, which may be managed by a SDN controller 119. The SDN domain 120 may comprise network nodes 122, 124, 126, and 128, which may be managed by a SDN controller 129. The SDN domain 130 may comprise network nodes 132, 134, and 136, which may be managed by a SDN controller 139. There may be other network nodes, such as network node 140, which are not part of any SDN domain.

Each of the network nodes may be coupled to one or more other network nodes via links, which may be used to interconnect nodes within network 100. For example, links may interconnect network nodes, ALTO server 102, SDN controllers 119, 129, and 139, and non-SDN compliant network node 140. Links may couple different nodes directly using fiber optic links, electrical links, wireless links, or indirectly using a logical connection or physical links with intervening nodes. Links may comprise a single link, a series of parallel links, a plurality of interconnected nodes, or various combinations thereof used to transport data within network 100.

Network 100 may be configured to support a variety of network applications, such as network virtualization, peer-to-peer file sharing, client-server file sharing, real-time communication, and on-demand media streaming. Network 100 may use the ALTO server 102 and SDN controllers 119, 129, and 139 to construct traffic-optimized paths to support the network applications. Some of these network applications may be SDN-compliant applications that locate and directly communicate with SDN controllers 119, 129, and 139. Other network applications may be non-SDN compliant network applications that indirectly communicate with SDN controllers via application protocol datagrams, such as a user datagram protocol (UDP). The application protocol diagrams may specify requirements for network resources (e.g. video data, audio data, and text data) for the non-SDN compliant network applications.

Partitioning the network 100 into the SDN domains 110, 120, and 130 may reduce the complexity of managing network 100, as each SDN domain or sub-network may be managed independently, to some degree. It is possible that a SDN domain, such as SDN domain 120, spans across a large geographical area or encompasses a large number of network nodes. The SDN domain 120 may be further divided into two or more sub-networks or sub-domains to reduce the complexity of managing the SDN domain 120. In an embodiment, SDN domain 120 may be one or more data center networks. As shown in FIG. 1, SDN domain 120 may be connected to other SDN domains (e.g., SDN domain 110) and/or non-SDN compliant network nodes (e.g., network node 140) via network links.

Within each SDN domain, a SDN controller may be configured to oversee the routing and other management functions (e.g. the control plane) for network nodes within the SDN domain. Take the SDN domain 110 as an example. The SDN controller 119 may not perform data plane functions, such as forwarding data traffic to a selected destination. The SDN controller 119 may be a generalized network controller configured to control the network nodes 112-116 by performing control path or control plane functionality, such as drawing a network map for the SDN domain 110 and performing resource management functions. Moreover, the SDN controller 119 may be able to produce routing tables and/or flow tables that defines how to route incoming packets within the SDN domain 110.

Depending on the implementation, the SDN controller 119 can be integrated into a network operating system (NOS), or run separately over a NOS. The SDN controller 119 may be configured to directly communicate with network nodes 112-116 via a southbound Open API service, such as the OpenFlow protocol. Network nodes 112-116 may be any physical and/or virtual network device that receives and transmits data through the SDN domain 110. Network nodes 112-116 may comprise switches, routers, bridges, or any other devices compatible with the Open API services. Furthermore, network nodes 112-116 may include network devices that are compliant with various versions of OpenFlow protocols.

As discussed above, implementing SDN within a large-scale network may be done incrementally, and thus a portion of the network 100 may not be SDN capable. FIG. 1 illustrates that network 100 may comprise at least one non-compliant SDN network node 140, may not be able to communicate with a SDN controller using a southbound Open API service. The non-compliant SDN network node 140 may be located outside any SDN domain and may not be managed by any SDN controller. FIG. 1 illustrates that the non-compliant SDN network node 140 may be directly coupled to the ALTO server 102. The network node 140 may be configured to communicate and provide network information directly to the ALTO server 102 for traffic optimization.

The ALTO server 102 may be configured to implement one or more ALTO protocols as defined in IETF publications. FIG. 1 illustrates that the ALTO server 102 may communicate with SDN controllers 119, 129, and 139 and non-compliant SDN network node 140. The ALTO server 102 may communicate with SDN controllers 119, 129, and 139 via a northbound Open API protocol, such as Extensible Messaging and Presence Protocol (XMPP), Representational State Transfer (REST, often known as RESTful), etc., to collect network information and/or transmit traffic-optimization decisions. The northbound Open API protocol may be a SDN-ALTO protocol that accommodates message exchanges between the ALTO server 102 and the SDN controllers 119, 129, and 139. The ALTO server 102 may collect network information from SDN controllers using a pull model and/or push model. More details on how the ALTO server 102 collects network information can be found in U.S. patent application Ser. No. 13/801,850 filed Mar. 13, 2013, by Zou, et al., entitled "Supporting Software Defined Networking with Application Layer Traffic Optimization," which is incorporated herein by reference.

The ALTO server 102 may be responsible for calculating traffic-optimization decisions for network 100 when supporting network applications. The traffic-optimization decisions may be for some or all of the sub-networks within network 100. The ALTO server 102 may calculate traffic-optimization decisions pursuant to requests by SDN controllers (e.g., SDN controller 119), applications, and/or network nodes (e.g., node 122 or 140) that operate as network path end points. The traffic-optimization decisions may modify network resource consumption patterns while maintaining and improving network performance. The traffic-optimization decisions may produce network maps and/or cost maps. For instance, cost maps may indicate the path costs transport data for a path that spans across multiple SDN domains. The ALTO server 102 may also be responsible for aggregating network information exported from the SDN controllers 119, 129, and 139 as well as non-compliant SDN network node 140.

Recall that each of the SDN controllers 119, 129, and 139 may be responsible for managing a specific SDN domain. For example, although the SDN controller 119 may receive network information within the SDN domain 110, the SDN controller 119 may not receive network information that pertains to topology of other SDN domains. Thus, the SDN controller 119 may not be aware of the status of the SDN domain 130. The SDN controller 119 may be aware of some edge nodes in other SDN domains, such as the network node 122. Likewise, the SDN controller 129 may be aware of the network node 114, which is also an edge node. However, in order to allocate the resources to satisfy certain network services (e.g. on-demand bandwidth, quality of services requirements), a SDN controller 119 may involve other SDN controllers such as 129, and 139 to create network paths that traverse multiple SDN domains. Using FIG. 1 as an example, one network path end point may be located in the SDN domain 110, while the other network path end point may be located in SDN domain 130. The path for the network path end points may span across multiple SDN domains 110, 120, and 130. The ALTO server 102 may use exported network information to calculate best paths across the SDN domains 110, 120, and 130. In an embodiment, some communication mechanisms, like message exchange protocols or SDN interconnection protocols, such as SDN interconnect (SDNi), may be used between SDN controllers 119, 129, and 139 to obtain network information that relates to other SDN domains.

Figure 2:
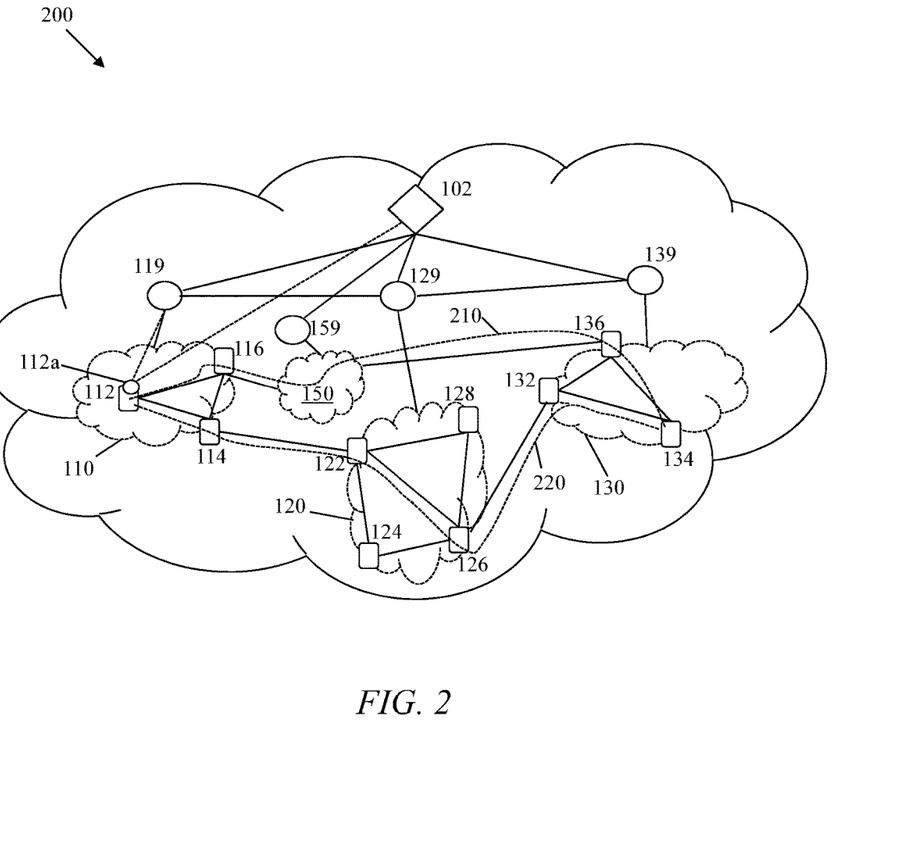
FIG. 2 is a schematic diagram of another embodiment of a network.

FIG. 2 is a schematic diagram of an embodiment of a network 200, which is similar to the network 100. FIG. 2 illustrates one more SDN domain 150, which is managed by a SDN controller 159, to illustrate different schemes of choosing best paths. Each network node may comprise one or more network applications. For example, the network node 112 may comprise a SDN application 112a. Network nodes, SDN applications, and SDN controllers may all be considered clients of the ALTO server 102.

In data communication, as an ALTO client, the application 112a may send out a request for path optimization to the SDN controller 119, which may forward the request to the ALTO server 102. The ALTO server 102 may return a set of destinations to an application running on the SDN controller 119. The set of destinations may be sorted by the ALTO server 102 in a particular order, and the best of the set of destinations may not reside in the local SDN domain 110. Instead, the best destination (assume it is the network node 134) may reside in another SDN domain 130, as shown in FIG. 2.

There may be several physical link paths from the source node (i.e., network node 112) to the best destination node (i.e., network node 134), spanning across multiple SDN domains. For example, a first possible path 210 may be a traditional IP best path determined by each involved SDN controller, and a second possible path 220 may be an ALTO best path determined by the ALTO server 102. Note that the paths 210 and 220 have the same source domain (i.e., SDN domain 110) and destination domain (i.e., SDN domain 130) but different intermediate domains. That is, the paths 210 and 220 cross intermediate SDN domains 150 and 120, respectively. To setup the path 210 across multiple SDN domains, the SDN controllers may utilize a path computation element (PCE) to compute the best path on the network layer. However, the path 220 may be determined by the ALTO server 102 on the application layer. Due to different algorithms used on the network layer and application layer, the IP best path 210 and the ALTO best path 220 may be different, as shown in FIG. 2.

For more efficient data communication, the ALTO best path 220 may be generally preferred over the IP best path 210. However, each segment of the ALTO best path 220 may still be determined by a corresponding SDN controller, which has topology of its local SDN domain. Suppose that a data flow needs to be transmitted from the source node 112 to the destination node 134. Various approaches may be used to set up an ALTO best path and deliver the data flow following the ALTO best path.

In an embodiment, the SDN application 112a may first submit, to its corresponding SDN controller 119, a request message comprising network addresses of a specific set of destinations, including the destination node 134. The request may also comprise a network address of the network node 112 and certain requirements (e.g., quality of service (QoS)) for communicating with the destination nodes. The SDN controller 119 may then forward the request to the ALTO server 102. Since the set of destinations may be located in one or more SDN domains, the ALTO server 102 may determine an order of the set of destinations. Specifically, the ALTO server 102 may compute best path per client's input: (source IP address, destination IP addresses) and based on the aggregated topology of the network 200. The ALTO server 102 may have knowledge about each SDN domain and all nodes covered by each SDN domain. Based on its knowledge base, the ALTO server 102 may judge which SDN domain each node in the path belongs to. For example, the ALTO server 102 can identify which domain the source node belongs to, all intermediate SDN domains over intermediate nodes in the best path, and destination SDN domain where destination node is located. Further, the ALTO server can figure out which SDN domains are involving the best path, e.g. which SDN domains the best path crosses. As ALTO is based on the application layer, application layer data, such as priority given to specific application or client, link cost, security policy, etc., may be used in determining an order representing the level of preference (e.g., the best destination is ranked first). Other destinations in the set may be used as backup destinations, e.g., when there is a broken link between the source and the best destination, or a firewall blocking data flow from the source to the best destination.

After determining the ordered set of destinations, the ALTO server 102 may send, to the SDN controller 119, information sufficient enough for the SDN controller 119 to determine which SDN domain(s) to cross, in order to reach each of the destinations. In one embodiment, the ALTO server may return the ordered set of destinations and a number of SDN identifiers (IDs) for each destination, wherein the SDN IDs identify one or more SDN domains en route to each destination. For example, for the destination node 134, the ALTO server 102 may send to the SDN controller 119: a) network address of the node 134, and b) ID for SDN domain 120 (denoted as ID2) and ID for SDN domain 130 (denoted as ID3). In another embodiment, the ALTO server 102 may return meta information to the SDN controller 119. The meta information may be computed result that enables the SDN controller 119 to at least determine which is the next SDN domain to forward the data to.

After the best destination(s) and path(s) to these destination(s) are determined by the ALTO server 102 and sent to the SDN controller 119, the SDN controller may go through the path(s) and communicates with corresponding SDN controllers in each of the involved SDN domains to set up the path(s). Inside each involved SDN domain, the responsible SDN controller may determine one or more local paths inside the domain. For example, the SDN controller 129 in intermediate SDN domain 120 may compute an IP best path from the edge node 122 to the edge node 126. Therefore, each SDN controller can optimize the application path segment in its own domain. Further, each SDN controller may either forward its local path information to its network nodes in advance, or do so when the actual data flow arrives.

After each involved SDN controller defines the path in its domain, and after the destination SDN controller (i.e., SDN controller 139) finishes setting up the best path to the destination node 134, a complete best path is defined for the SDN application 112a. Furthermore, each path segment in involved SDN domains may be sent to the SDN controller 119 via a message exchange protocol (e.g., SDNi) across multiple SDN domains. Finally, information of the whole path may be aggregated in the SDN controller 119. The path view may be sent to the source application 112a, so that the data flow can be routed or forwarded to the destination node 134 via the best path.

En route to the destination, when the data flow arrives at an edge node of a new SDN domain (take the SDN domain 120 as an example), a flow table stored in the edge node 122 may be checked to see whether a corresponding forwarding path has already been stored in the flow table. If the forwarding path exists, which suggests the path has been pre-stored, the data flow may be forwarded right away; otherwise, the data flow may be forwarded to the corresponding SDN controller 129. Since SDN controller 129 has already computed its local path for the data flow, it may send local path information to some or all of its local network nodes. Meanwhile, a temporary loop path may be set up by the SDN controller 129, so that the data flow may not block subsequent data flows.

It can be seen that a variety of network devices, including SDN applications, SDN controllers, and the ALTO server, work collaboratively herein to define data flow paths. Within this principle, other implementations or embodiments can also be used. For example, instead of submitting a request message through the SDN controller 119, the source application 112a may submit the request message to the ALTO server 102 directly. The ALTO server may send, back to the application 112a, meta information or a set of destinations with SDN IDs. After receiving necessary information from the ALTO server 102, the application 112a (or the network node 112) may sort and choose the best destination(s) as well as path(s) to the destination(s). The destinations and QoS or attributes over paths may be chosen and specified by the SDN application 112a. Afterwards, destination and path information may be sent from the application 112a to the SDN controller 119, and SDN controllers including the source controller 119 may implement the paths to the sorted destinations.

In an embodiment, instead of using protocols such as SDNi to communicate path information between SDN controllers, the path information may be added or inserted into a data flow, such that no communication may be needed between the SDN controllers. In this case, the path information and requirements (e.g., QoS) may be inserted into the first packet of a data flow. The data flow may then be sent from the source application to its corresponding source SDN controller, which needs to be capable of interpreting the path information from the data flow. The source SDN may determine, based on the path information, the best local path and the next edge node belonging to a neighboring SDN domain. The data flow may then be forwarded to the next neighboring SDN domain, in which similar actions may be performed, until the data flow reaches its destination.

Figure 3:
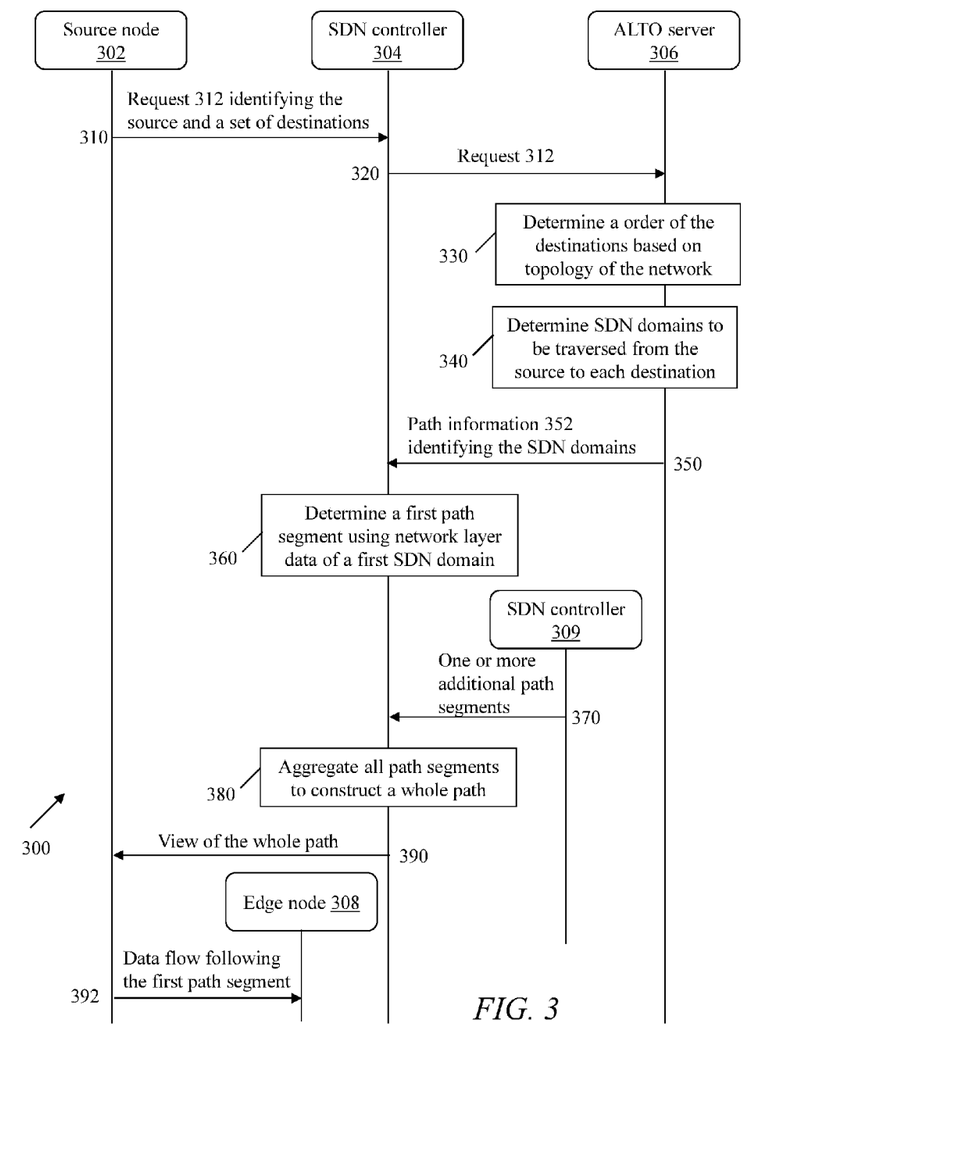
FIG. 3 is a flowchart of an embodiment of a communication protocol.

FIG. 3 is a diagram of an embodiment of a communication protocol 300, which may be implemented in a network, such as the network 100 or 200 for SDN applications to define data flow paths. As shown in FIG. 3, the protocol 300 uses a number of exemplary network nodes to illustrate basic principles of setting up a flow path, although it should be understood that other network devices or nodes may be used and modifications may be made on the protocol 300, as one of ordinary skill in the art will recognize.

Setting up a data flow path from a source node 302 to a set of destination nodes (not shown in FIG. 3) may start from step 310, in which a request message 312 may be transmitted or sent from the source node 302 to a SDN controller 304. The request message 312 comprises information identifying the source node 302 and the set of destination nodes, which may include one or more nodes. For example, the request message 312 may comprise IP addresses of the source node 302 and the set of destinations. Note that the source node 302 and the SDN controller 304 are both located in a first SDN domain.

In step 320, the SDN controller 304 may forward the request message 312 to an ALTO server 306, which may be configured to manage the entire network or AS. Note that forwarding may comprise any processing and/or conversion steps wherever necessary. Further, note that, in an alternative embodiment, the source node 302 may send the request 310 directly to the ALTO server 306 without routing through the SDN controller 304.

In step 330, the ALTO server 306 may determine an order of the destination nodes in terms of their preference to be used by the source node 302. Determining the order may be at least partially based on topology of the network and may use application layer data, such as QoS requirements, security policies, etc. In step 340, the ALTO server 306 may further determine one or more SDN domains to be traversed from the source node 302 to each of the destination nodes.

In step 350, path information 352 may be sent from the ALTO server 306 to the SDN controller 304. Note that the path information 352 may also be returned to the source node 302 directly from the ALTO server 306. The path information 352 may identify the SDN domains to be traversed from the source node 302 to one of the destination nodes (assume here it is the most preferred destination), wherein the SDN domains comprises the first SDN domain, in which the SDN controller 304 resides, and a second SDN domain, in which an edge node 308 known by the SDN controller 304 resides. For example, the path information 352 may comprise SDN IDs of all involved SDN domains, or may comprise meta information identifying at least one network node located in each of the involved SDN domains.

In step 360, the SDN controller 304 may determine a first path segment from the source node 302 to the edge node 308. Determination of the first path segment may be based on network layer data (e.g., IP links) of the first SDN domain. In step 370, the SDN controller 304 may receive one or more additional path segments from another SDN controller 309, which may be configured to oversee the second SDN domain comprising the edge node 308. The additional path segments may be determined by the SDN controller 309, other SDN controllers, and/or the ALTO server 306 (e.g., for segment connecting a non-SDN compliant node such as node 140). Further, the additional path segments may be transmitted between SDN controllers using protocols such as the SDNi protocol.

In step 380, the SDN controller 304 may aggregate the first path segment and the additional path segments to construct a whole path from the source node 302 to the most preferred destination node. In step 390, a view of the whole path may be sent from the SDN controller 304 to the source node 302.

Now that the whole path is known by the source node 302, in step 392, a data flow may be sent from the source node 302 to the edge node 308 following the first path segment. Note that en route to the edge node 308 and eventually to the preferred destination, the data flow may be forwarded by additional network nodes. Further, a person of ordinary skill in the art will recognize that the protocol only illustrates a portion of necessary steps in completing setting up a best path and transmission of a data flow from the source to at least one destination following the best path. Accordingly, other steps and details may be added, as described previously.

In an example, suppose that there are four domains denoted as A, B, C, and D to be traversed from a source node to a destination node. Based on the ALTO server's return information, an application wants to send a data packet from source node, $\underline{s}$, to a destination node, $\underline{d}$, that crosses SDN domains from A, B, C, and D. The source node, $\underline{s}$, is in A, and the destination node, $\underline{d}$, is within D. The application sends this information to its local SDN controller which controls domain A. In domain A, the SDN controller knows all edge nodes connecting to the next SDN domain B, and the controller sets up the path from its node $\underline{s}$ to one of the edge nodes connecting to the SDN domain B. The SDN controller in B does a similar thing in its domain from its incoming node to the node connecting its next domain C. The controllers in domains C and D do the same thing until the controller in D sets up the path to destination node $\underline{d}$. In each SDN domain, the controller can do optimization for the path in its domain and eventually each SDN controller defines the segment of the path in its domain, and a whole path is finally defined with optimization in each domain. Then the ALTO client application can take the finally defined path as the "BEST" optimized path.

Such best path may in the form of $a[1]$-> $a[2]$-> ... ->$a[j]$->$b[1]$->$b[2]$-> ... ->$b[m]$->$c[1]$-> $c[2]$-> ... ->$c[n]$->$d[1]$->$d[2]$-> ... ->$d[k]$, where $a[1]$ denotes the source node and $d[k]$ denotes the destination node, and nodes $a[i1]$, $b[i2]$, $c[i3]$, $d[i4]$ are covered by SDN domains A, B, C, and D respectively ($1<=i1<=j$, $1<=i2<=m$, $1<=i3<=n$, $1<=i4<=k$). This SDN/ALTO cooperation solution needs a protocol to transfer the path node/link QoS, requirements etc. from original A, to B, C, and D, so that B/C/D sets up the path per the original application's requirements. This can be any message exchange protocol for inter SDN domains. Finally, domains B/C/D send back the path in its domain via the inter-SDN protocol to A so that the application in A has a whole path view.

Figure 4:
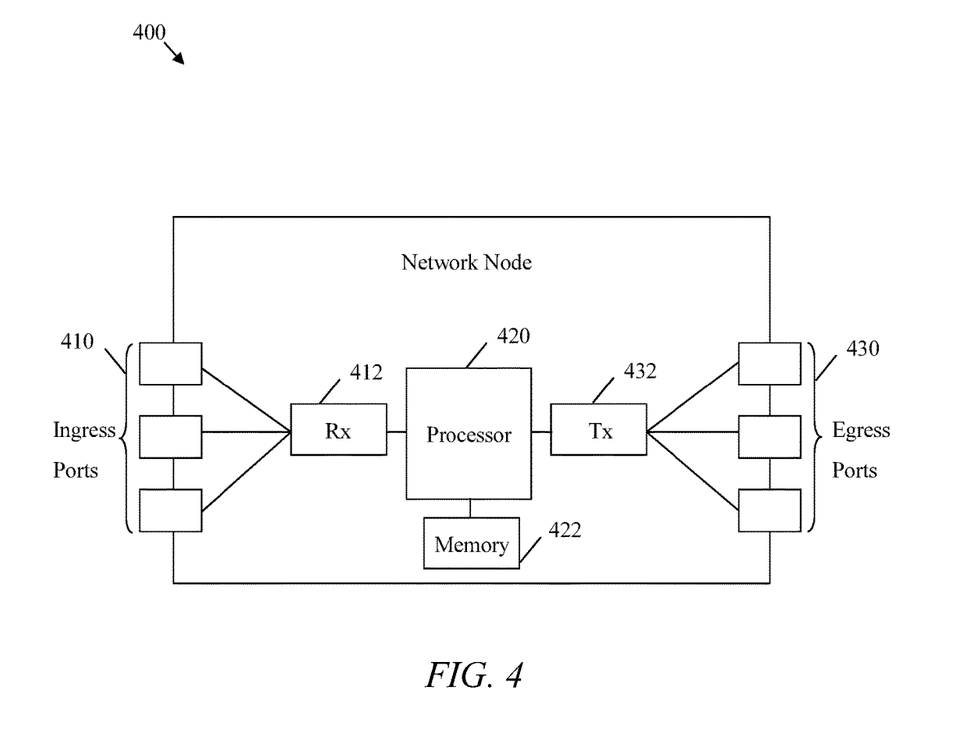
FIG. 4 is a diagram of an embodiment of a network node.

FIG. 4 illustrates an embodiment of a network unit or node 400, which may be any device configured to transport data flows through a network. For instance, the network node 400 may correspond to the network node 112, 114, 122, 134, or any other node. The network node 400 may comprise one or more ingress ports 410 coupled to a receiver 412 (Rx), which may be configured for receiving packets or frames, objects, options, and/or type length values (TLVs) from other network components. The network node 400 may comprise a logic unit or processor 420 coupled to the receiver 412 and configured to process the packets or otherwise determine which network components to send the packets. The processor 420 may be implemented using hardware, or a combination of hardware and software.

The network node 400 may further comprise a memory 422, which may be a memory configured to store a flow table, or a cache memory configured to store a cached flow table. The network node 400 may also comprise one or more egress ports 430 coupled to a transmitter 432 (Tx), which may be configured for transmitting packets or frames, objects, options, and/or TLVs to other network components. Note that, in practice, there may be bidirectional traffic processed by the network node 400, thus some ports may both receive and transmit packets. In this sense, the ingress ports 410 and the egress ports 430 may be co-located or may be considered different functionalities of the same ports that are coupled to transceivers (Rx/Tx). The processor 420, the memory 422, the receiver 412, and the transmitter 432 may also be configured to implement or support any of the schemes and methods described above, such as the protocol 300.

It is understood that by programming and/or loading executable instructions onto the network node 400, at least one of the processor 420 and the memory 422 are changed, transforming the network node 400 in part into a particular machine or apparatus (e.g. a SDN switch having the functionality taught by the present disclosure). The executable instructions may be stored on the memory 422 and loaded into the processor 420 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Figure 5:
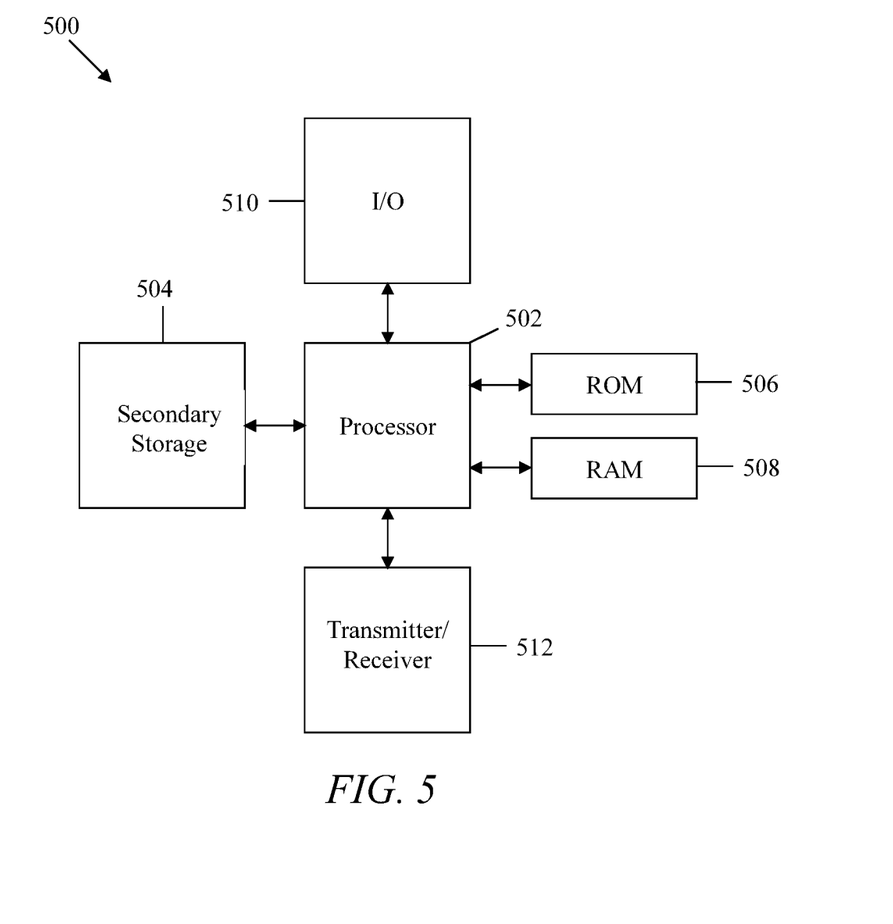
FIG. 5 is a diagram of an embodiment of a computer system.

The system and schemes described above may be implemented on a network component or computer system, such as a computer or network component with sufficient processing power, memory resources, and network throughput capability to handle the necessary workload placed upon it. FIG. 5 illustrates an embodiment of a computer system 500 suitable for implementing one or more embodiments of the systems and methods disclosed herein, such as the ALTO server 102, the network nodes, and the SDN controllers 119, 129, 139, and 159.

The computer system 500 includes a processor 502 that is in communication with memory devices including secondary storage 504, read only memory (ROM) 506, random access memory (RAM) 508, input/output (I/O) devices 510, and transmitter/receiver 512. Although illustrated as a single processor, the processor 502 is not so limited and may comprise multiple processors. The processor 502 may be implemented as one or more central processor unit (CPU) chips, cores (e.g., a multi-core processor), field-programmable gate arrays (FPGAs), ASICs, and/or digital signal processors (DSPs). The processor 502 may be configured to implement any of the schemes described herein, including the protocol 300. The processor 502 may be implemented using hardware or a combination of hardware and software.

The secondary storage 504 is typically comprised of one or more disk drives or tape drives and is used for non-volatile storage of data and as an over-flow data storage device if the RAM 508 is not large enough to hold all working data. The secondary storage 504 may be used to store programs that are loaded into the RAM 508 when such programs are selected for execution. The ROM 506 is used to store instructions and perhaps data that are read during program execution. The ROM 506 is a non-volatile memory device that typically has a small memory capacity relative to the larger memory capacity of the secondary storage 504. The RAM 508 is used to store volatile data and perhaps to store instructions. Access to both the ROM 506 and the RAM 508 is typically faster than to the secondary storage 504.

The transmitter/receiver 512 (sometimes referred to as a transceiver) may serve as an output and/or input device of the computer system 500. For example, if the transmitter/receiver 512 is acting as a transmitter, it may transmit data out of the computer system 500. If the transmitter/receiver 512 is acting as a receiver, it may receive data into the computer system 500. Further, the transmitter/receiver 512 may include one or more optical transmitters, one or more optical receivers, one or more electrical transmitters, and/or one or more electrical receivers. The transmitter/receiver 512 may take the form of modems, modem banks, Ethernet cards, universal serial bus (USB) interface cards, serial interfaces, token ring cards, fiber distributed data interface (FDDI) cards, and/or other well-known network devices. The transmitter/receiver 512 may enable the processor 502 to communicate with an Internet or one or more intranets. The I/O devices 510 may be optional or may be detachable from the rest of the computer system 500. The I/O devices 510 may include a video monitor, liquid crystal display (LCD), touch screen display, or other type of display. The I/O devices 510 may also include one or more keyboards, mice, or track balls, or other well-known input devices.

Similar to the network node 400, it is understood that by programming and/or loading executable instructions onto the computer system 500, at least one of the processor 502, the secondary storage 504, the RAM 508, and the ROM 506 are changed, transforming the computer system 500 in part into a particular machine or apparatus (e.g. a SDN controller or ALTO server having the functionality taught by the present disclosure). The executable instructions may be stored on the secondary storage 504, the ROM 506, and/or the RAM 508 and loaded into the processor 502 for execution.

Any processing of the present disclosure may be implemented by causing a processor (e.g., a general purpose CPU) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a software defined network (SDN) controller, the method comprising:
   receiving, from a network node, a request for path optimization, wherein the request comprises information identifying the network node and a destination node;
   forwarding the request to an application layer traffic optimization (ALTO) server configured to manage a plurality of SDN controllers each controlling a different SDN domain and to mananage at least one non-compliant SDN node located outside any SDN domain;
   receiving, from the ALTO server, path information that identifies more than two of a plurality of SDN domains to be traversed from he network node to the destination node, wherein the plurality of SDN domains comprises a first SDN domain, in which the SDN controller and the network node reside, and a second SDN domain, in which an edge node known by the SDN controller resides; and
   determining a first path segment from the network node to the edge node based on the path information received from the ALTO server.

2. The method of claim 1, wherein the information in the request identifies a set of destination nodes, wherein the path information from the ALTO server comprises an order of the destination nodes and further identifies one or more SUN domains for each of the destination nodes, and wherein the order represents a level of preference to be used by the network node.

3. The method of claim 1, wherein the information in the request comprises network addresses of source and destination nodes, and wherein the path information from the ALTO server comprises a plurality of SDN identifiers (IDs), each of which identifies one of the plurality of SDN domains.

4. The method of claim 1, wherein the path information comprises meta information identifying at least one network node located in each of the plurality of SDN domains.

5. The method of claim 1, wherein determining the first path segment is at least partially based on network layer data of the first SDN domain.

6. The method of claim 1, further comprising:
receiving one or more additional path segments from a second SDN controller residing in the second SDN domain, wherein each of the additional path segments is determined by a corresponding SDN controller residing in one of the plurality of SDN domains; and
aggregating the first path segment and the additional path segments to construct a whole path from the network node to the destination node.

7. The method of claim 6, further comprising sending a view of the whole path to the network node.

8. The method of claim 6, wherein receiving the one or more additional path segments from the second SDN controller follows a SDN interconnect (SDNi) message exchange protocol.

9. An apparatus comprising:
at least one transceiver configured to:
receive, from a network node, a request for path optimization, wherein the request comprises information identifying the network node and a destination node;
forward the request to an application layer traffic optimization (ALTO) server configured to manage a plurality of software defined network (SDN) controllers each controlling a different SDN domain and to manage at least one non-compliant SDN node located outside any SDN domain; and
receive, from the ALTO server, path information that identifies more than two of a plurality of SDN domains to be traversed from the network node to the destination node, wherein the plurality of SDN domains comprises a first SDN domain, in which the apparatus and the network node reside, and a second SDN domain, in which an edge node known by the apparatus resides; and
a processor coupled to the at least one transceiver and configured to determine a first path segment from the network node to the edge node based on the path information received from the ALTO server.

10. The apparatus of claim 9, wherein the information in the request identifies a set of destination nodes, wherein the path information from the ALTO server comprises an order of the destination nodes and further identifies one or more SDN domains for each of the destination nodes, wherein the order represents a level of preference to be used by the network node, and wherein the destination node is the most preferred of the destination nodes according to the order.

11. The apparatus of claim 9, wherein the information in the request comprises network addresses of source and destination nodes, and wherein the path information from the ALTO server comprises a plurality of SDN identifiers (IDs), each of which identifies one of the plurality of SDN domains.

12. The apparatus of claim 9, wherein the path information comprises meta information identifying at least one network node located in each of the plurality of SDN domains.

13. The apparatus of claim 9, wherein determining the first path segment comprises using network layer data of the first SDN domain.

14. The apparatus of claim 9, wherein the at least one transceiver is further configured to receive one or more additional path segments from a second apparatus residing in the second SDN domain, wherein each of the additional path segments is determined by a corresponding apparatus residing in one of the plurality of SDN domains, wherein the processor is further configured to aggregate the first path segment and the additional path segments to construct a whole path from the network node to the destination node, and wherein the at least one transceiver is further configured to send a view of the whole path to the network node.

15. The apparatus of claim 14, wherein receiving the one or more additional path segments from the second apparatus follows an inter-SDN interconnect (SDNi) message exchange protocol.

16. A method implemented by an application layer traffic optimization (ALTO) server located in a network and configured to manage a plurality of software defined network (SDN) controllers each controlling a different SDN domain and to manage at least one non-compliant SDN node located outside any SDN domain, the method comprising:
receiving, from an ALTO client by way of a SDN controller configured to determine paths through an SDN domain, a request for path optimization, wherein the request comprises information identifying a source node and a destination node;
determining a plurality of SDN domains to be traversed from the source node to the destination node; and
sending, to the ALTO client, path information that identifies more than two of the plurality of SDN domains.

17. The method of claim 16, wherein the information in the request identifies a set of destination nodes, the method further comprising:
determining, at least partially based on topology of the network, an order of the destination nodes in terms of their preference to be used by the source node; and
determining one or more SDN domains to be traversed from the source node to each of the destination nodes, and
wherein the path information sent to the ALTO client comprises the order of the destination nodes and further identifies the one or more SDN domains for each of the destination nodes.

18. The method of claim 16, wherein the path information comprises an internet protocol (IP) address of the destination node and a plurality of SDN identifiers (IDs), each of which identifies one of the plurality of SDN domains.

19. The method of claim 16, wherein the path information comprises meta information identifying at least one network node in each of the plurality of SDN domains.

20. The method of claim 16, wherein the ALTO client is a SDN application implemented on the source node.

21. A method implemented by a network node comprising a software defined network (SDN) application, the method comprising:
sending, to an application layer traffic optimization (ALTO) server by way of an SDN controller configured to determine paths through a SDN domain, a request message comprising information identifying a destination node, wherein the ALTO server is configured to manage a plurality of SDN controllers each controlling a different SDN domain and to manage at least one non-compliant SDN node located outside any SDN domain; and
receiving, from the ALTO server, path information that identifies more than two of a plurality of SDN domains to be traversed from the network node to the destination node.

22. The method of claim 21, further comprising:
receiving, from the SDN controller, a path view comprising a first path segment connecting the network node to an edge node, wherein the SDN controller and the network node are both located in a first SDN domain, wherein the edge node is located in a second SDN domain and known by the SDN controller; and sending, to the edge node, a data flow following the first path segment.

23. The method of claim 22, further comprising inserting the path view into one or more packets of the data flow prior to sending the data flow.

24. The method of claim 21, wherein the path information comprises an internet protocol (IP) address of the destination node and a plurality of SDN identifiers (IDs), each of which identifies one of the plurality of SDN domains.

* * * * *

UNITED STATES PATENT AND TRADEMARK OFFICE
CERTIFICATE OF CORRECTION

PATENT NO.        : 9,729,424 B2
APPLICATION NO.   : 13/915410
DATED             : August 8, 2017
INVENTOR(S)       : Hongtao Yin et al.

It is certified that error appears in the above-identified patent and that said Letters Patent is hereby corrected as shown below:

In the Claims

Column 14, Lines 32-52, Claim 1, should read:
1. A method implemented by a software defined network (SDN) controller, the method comprising:
    receiving, from a network node, a request for path optimization, wherein the request comprises information identifying the network node and a destination node;
    forwarding the request to an application layer traffic optimization (ALTO) server configured to manage a plurality of SDN controllers each controlling a different SDN domain and to manage at least one non-compliant SDN node located outside any SDN domain;
    receiving, from the ALTO server, path information that identifies more than two of a plurality of SDN domains to be traversed from the network node to the destination node, wherein the plurality of SDN domains comprises a first SDN domain, in which the SDN controller and the network node reside, and a second SDN domain, in which an edge node known by the SDN controller resides; and
    determining a first path segment from the network node to the edge node based on the path information received from the ALTO server.

Column 14, Lines 53-59, Claim 2, should read:
2. The method of claim 1, wherein the information in the request identifies a set of destination nodes, wherein the path information from the ALTO server comprises an order of the destination nodes and further identifies one or more SDN domains for each of the destination nodes, and wherein the order represents a level of preference to be used by the network node.

Signed and Sealed this
Third Day of October, 2017

Joseph Matal
*Performing the Functions and Duties of the*
*Under Secretary of Commerce for Intellectual Property and*
*Director of the United States Patent and Trademark Office*